(12) United States Patent
Slaughter

(10) Patent No.: US 9,609,860 B1
(45) Date of Patent: Apr. 4, 2017

(54) CLANDESTINE ANCHORED FLOATING APPARATUS

(71) Applicant: Alan Slaughter, Cataula, GA (US)

(72) Inventor: Alan Slaughter, Cataula, GA (US)

(*) Notice: Subject to any disclaimer, the term of this patent is extended or adjusted under 35 U.S.C. 154(b) by 0 days.

(21) Appl. No.: 15/219,875

(22) Filed: Jul. 26, 2016

(51) Int. Cl.
*A01M 31/06* (2006.01)
*G08C 19/00* (2006.01)

(52) U.S. Cl.
CPC ............. *A01M 31/06* (2013.01); *G08C 19/00* (2013.01)

(58) Field of Classification Search
CPC .................................................... A01M 31/06
USPC ...... 43/2, 3, 26.1, 43.11; 446/158, 154, 156, 446/160, 165
See application file for complete search history.

(56) References Cited

U.S. PATENT DOCUMENTS

| | | | |
|---|---|---|---|
| 2,443,040 A * | 6/1948 | Jones | A01M 31/06 43/3 |
| 2,589,913 A | 3/1952 | Wenner | |
| 2,616,200 A | 11/1952 | Milam | |
| 2,719,376 A | 10/1955 | Risch | |
| 2,909,859 A | 11/1959 | Christmas | |
| 2,917,857 A * | 12/1959 | Muszynski | A01M 31/06 43/3 |
| 3,079,719 A * | 3/1963 | Muszynski | A01M 31/06 43/3 |
| 4,656,771 A | 4/1987 | Holmes | |
| 4,757,630 A | 7/1988 | Torberg | |
| 4,827,653 A | 5/1989 | Sewell | |
| 5,168,650 A | 12/1992 | Martin | |
| 5,367,813 A * | 11/1994 | Cherry | A01M 31/06 43/2 |
| 5,377,439 A | 1/1995 | Roos et al. | |
| 5,899,014 A | 5/1999 | Bornhoft et al. | |
| 6,487,811 B2 * | 12/2002 | Barrett | A01M 31/06 43/3 |
| 6,647,657 B2 * | 11/2003 | Igo | A01M 31/06 43/3 |
| 6,857,216 B1 | 2/2005 | Merin | |
| 7,257,921 B1 | 8/2007 | Hellmann | |
| 7,475,509 B2 | 1/2009 | Cagle | |
| 8,028,462 B2 | 10/2011 | Sieman | |
| 8,146,285 B1 * | 4/2012 | Jones | A01M 31/06 43/2 |
| 8,316,575 B2 | 11/2012 | Bradley | |
| 9,258,993 B2 | 2/2016 | Szechenyi et al. | |
| 9,265,246 B2 * | 2/2016 | Thomas | A01M 31/06 |
| 2003/0061754 A1 * | 4/2003 | Cicoff | A01M 31/06 43/2 |
| 2005/0178043 A1 | 8/2005 | Markley et al. | |

(Continued)

*Primary Examiner* — Marc Burgess
(74) *Attorney, Agent, or Firm* — Dale J. Ream

(57) ABSTRACT

A clandestine anchored floating apparatus includes a shaped waterfowl decoy having a hollow body defining an interior area and a keel coupled to a bottom of the body. An anchor assembly is positioned in the interior area of the body that includes a rotatably mounted reel and an elongate anchor line rotatably wound on the reel, the reel configured to selectively pay out or reel in the anchor line relative to the reel. The anchor assembly includes an anchor weight coupled to a distal end of the anchor line. The anchor assembly includes a motor electrically connected to a battery and operatively coupled to the reel, the motor configured to actuate the reel to pay out or reel in the anchor line relative to the reel when energized.

18 Claims, 19 Drawing Sheets

(56) References Cited

U.S. PATENT DOCUMENTS

| | | |
|---|---|---|
| 2006/0162228 A1 | 7/2006 | Sieman |
| 2008/0263930 A1 | 10/2008 | Sieman |
| 2010/0139146 A1* | 6/2010 | Elpi ..................... A01M 31/06 43/3 |
| 2015/0282476 A1* | 10/2015 | Mintz .................... A01M 1/02 43/3 |
| 2016/0128319 A1* | 5/2016 | Smart ................... A01M 31/06 43/2 |
| 2016/0205921 A1* | 7/2016 | Janzen, Jr. ............ A01M 31/06 |

* cited by examiner

CLANDESTINE ANCHORED FLOATING APPARATUS

BACKGROUND OF THE INVENTION

This invention relates generally to floating devices and, more particularly, to a floating waterfowl decoy having an anchor assembly to keep the decoy in a relatively stationary position on the water yet having rotational movement and a speaker that can be actuated by radio frequency remote control to enhance the clandestine effectiveness of the decoy.

The use of floatable "decoys" having a shape and even painted configuration that looks like a genuine waterfowl have been used for decades by hunters to create or recreate an environment that is hospitable and alluring to real waterfowl in an effort to get them to fly and land on the water. Then, when one or more of the real ducks is in range of a shotgun blast, the hunter is able to take a shot and, if successful, kill one or more of the ducks. The problem with placing decoys on the water, of course, is that wind and water currents may cause all the decoys to float away or accumulate together along the edge of the body of water or, worse yet, drift away down a connected stream or river.

Various devices have been proposed to prevent decoys from floating away, including decoys having weights that extend into the water and anchor the decoy in place. Although presumably effective for their intended purposes, these devices and proposals still lack full effectiveness in that, while looking like a duck, they don't act like a duck and may not be as alluring to real waterfowl as would be desirable.

Therefore, it would be desirable to have an anchored floating apparatus shaped and decorated in the form of waterfowl that includes a reel configured to selectively pay out or reel in an anchor line having an anchor. Further, it would be desirable to have an anchored floating apparatus having a receiver configured to actuate the reel when an actuation signal is received from a remote control device. In addition, it would be desirable to have an anchored floating apparatus having a speaker configured to emit authentic waterfowl or nature sounds and also to have structures for rotating the decoy body to simulate normal waterfowl movements.

SUMMARY OF THE INVENTION

A clandestine anchored floating apparatus according to the present invention includes a shaped waterfowl decoy having a hollow body defining an interior area and a keel coupled to a bottom of the body. An anchor assembly is positioned in the interior area of the body that includes a rotatably mounted reel and an elongate anchor line rotatably wound on the reel, the reel configured to selectively pay out or reel in the anchor line relative to the reel. The anchor assembly includes an anchor weight coupled to a distal end of the anchor line. The anchor assembly includes a motor electrically connected to a battery and operatively coupled to the reel, the motor configured to actuate the reel to pay out or reel in the anchor line relative to the reel when energized.

Therefore, a general object of this invention is to provide an anchored floating apparatus, i.e. a "duck decoy" in the shape of waterfowl that has a selectively operable reel and anchor assembly for keeping the decoy in place on a body of water.

Another object of this invention is to provide an anchored floating apparatus, as aforesaid, having a receiver electrically connected to the reel, a motor, and a battery that is configured to energize the motor to operate the reel when an actuation signal is received from a remote control transmitter (such as may be operated by the hunter on shore or at a time of set up or clean up).

A still further object of this invention is to provide an anchored floating apparatus, as aforesaid, having a speaker that may be actuated to emit predetermined sounds indicative of waterfowl or of an alluring waterfowl habitat.

Yet another object of this invention is to provide an anchored floating apparatus, as aforesaid, in which the decoy has structures for rotatably moving to simulate natural movements of waterfowl.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 6b is an isolated view on an enlarged scale taken from FIG. 6a;

FIG. 7a is a top view of the gear train and keel illustrated in FIG. 6a;

FIG. 7b is a sectional view taken along line 7b-7b of FIG. 7a;

FIG. 8b is a sectional view taken along line 8b-8b of FIG. 8a;

FIG. 13a is a front end view of the body member according to the present invention;

FIG. 13b is a sectional view taken along line 13b-13b of FIG. 13a;

FIG. 14b is an exploded view of the gear train as in FIG. 14a;

DESCRIPTION OF THE PREFERRED EMBODIMENT

Figure 1:
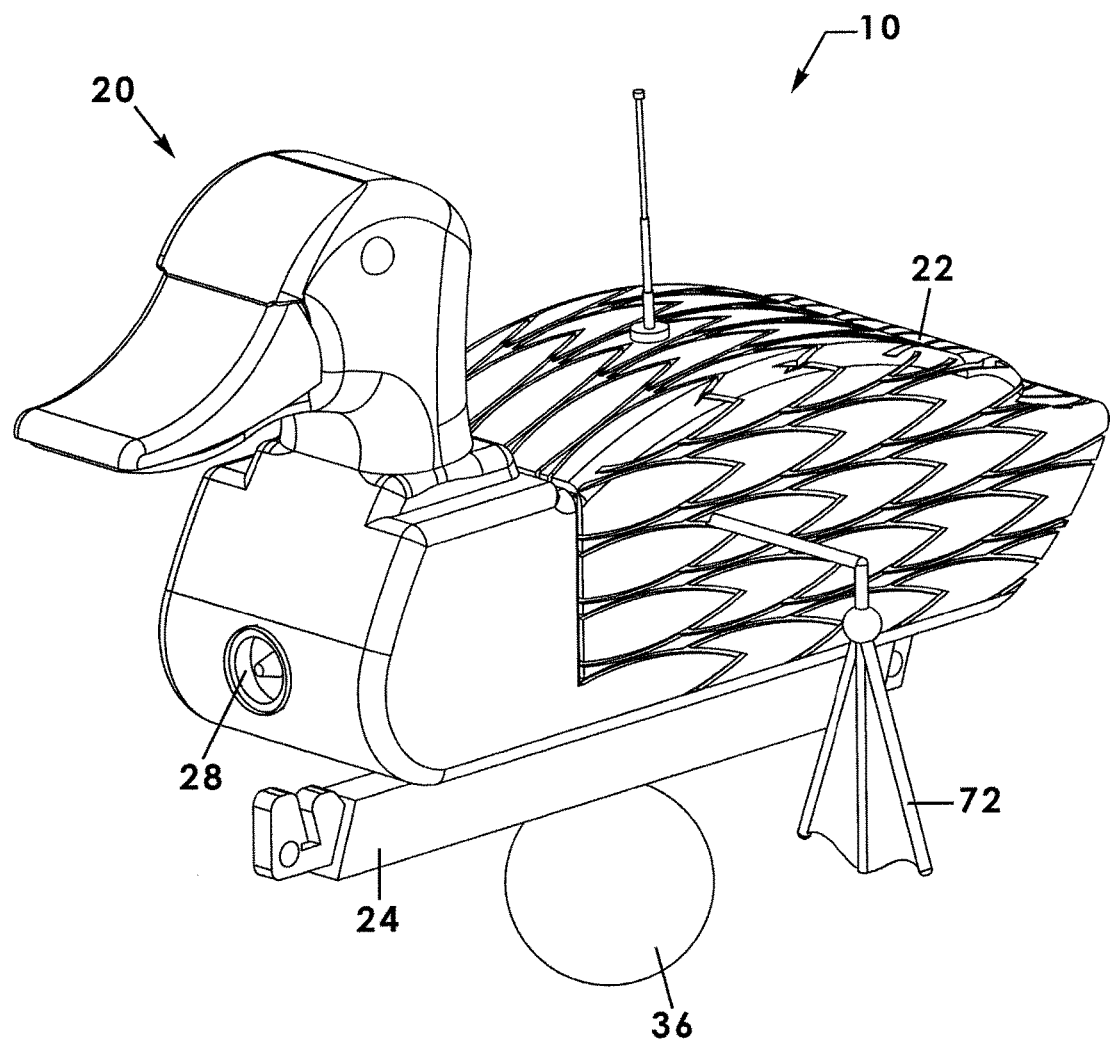
FIG. 1 is a perspective view of an anchored floating apparatus according to a preferred embodiment of the present invention.

A clandestine anchored floating apparatus according to a preferred embodiment of the present invention will now be described with reference to FIGS. 1 to 17 of the accompanying drawings. The clandestine anchored floating apparatus 10 (which may be referred to as the "anchor floating apparatus" or just "floating apparatus") may include a decoy 20 having a body 22 and a keel 24, an anchor assembly 30, a mounting assembly 60, and a receiver 44.

The decoy 20 may be shaped in the form of a waterfowl such as a duck so as to lure other ducks to a body of water, such as in a hunting situation. The body 22 portion of the decoy 20 resembles the body of a duck and has shaped walls that define an interior area. This configuration not only makes the decoy lightweight and buoyant but provides space to enclose other components as will be discussed below. The body 22 may be rotatably coupled to the keel 24.

Figure 3A:
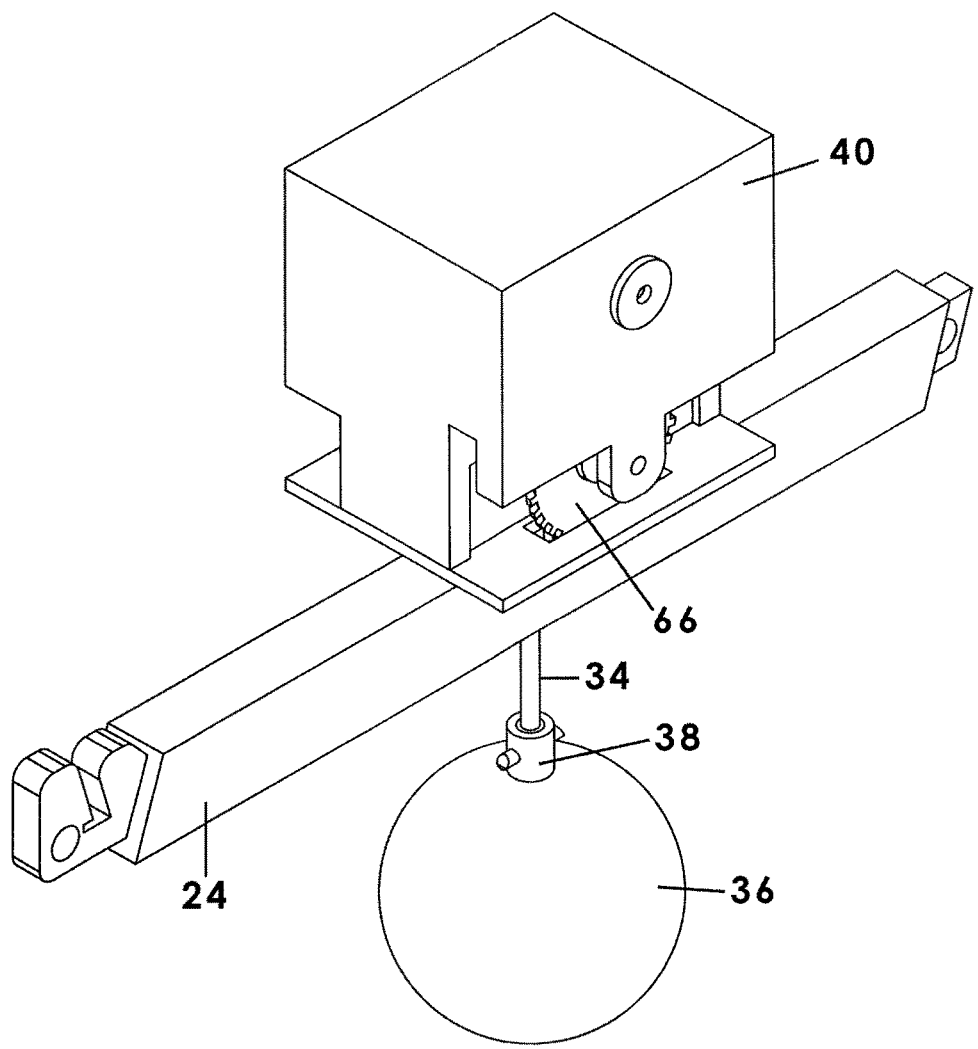
FIG. 3a is an isolated view of an anchoring assembly as in FIG. 2 illustrated in a retracted configuration.
Figure 3B:
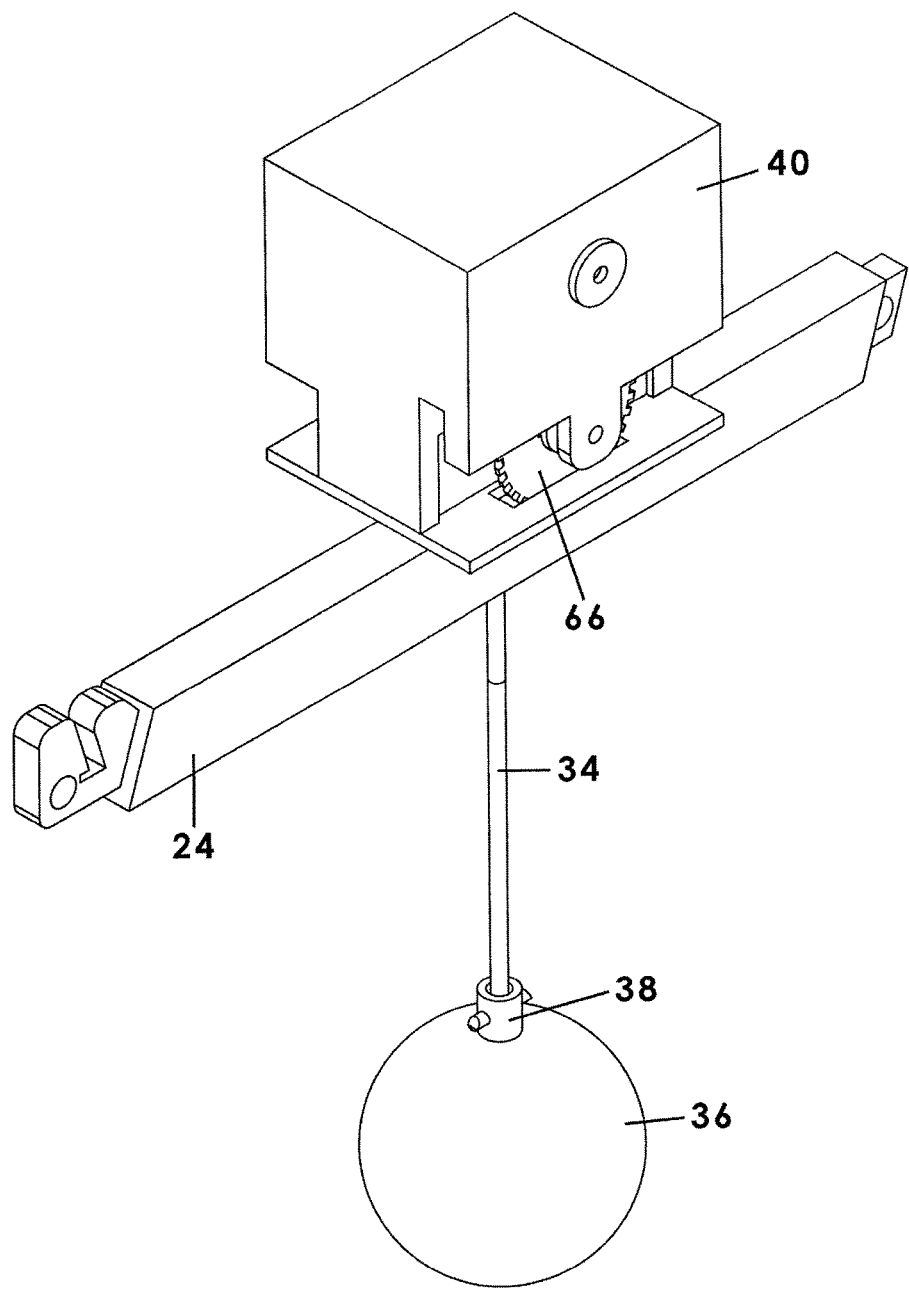
FIG. 3b is an isolated view of an anchoring assembly as in FIG. 2 illustrated in a deployed configuration.
Figure 15:
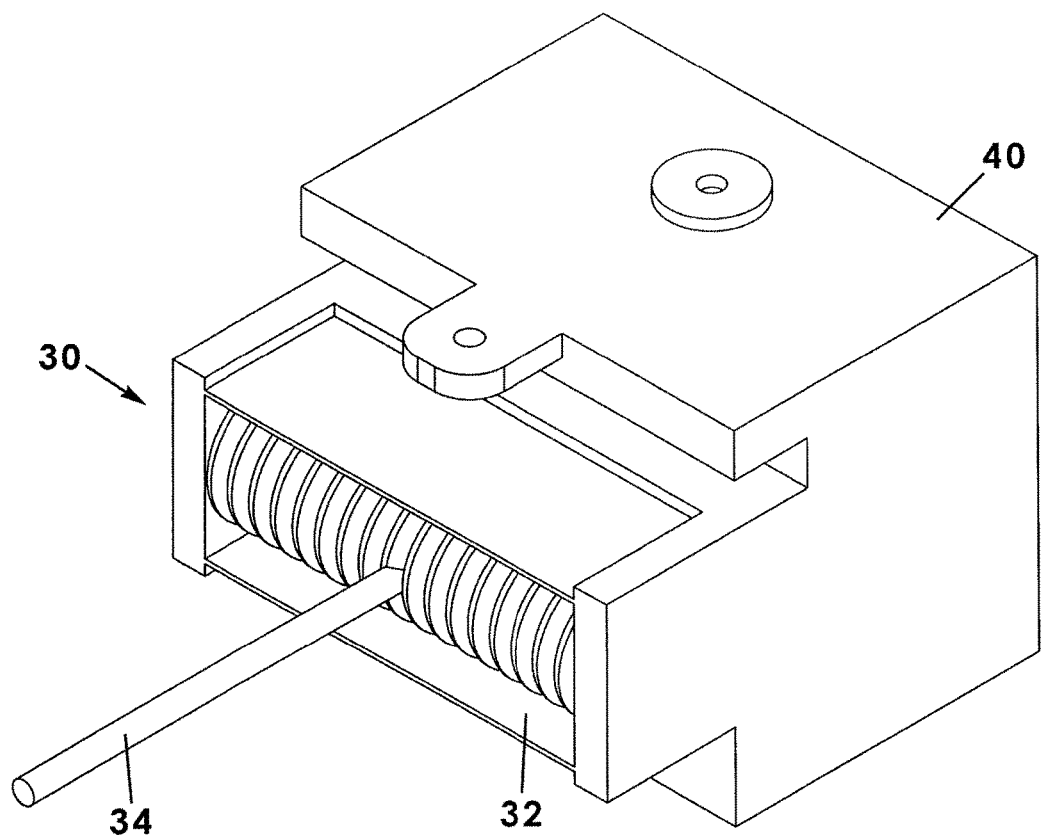
FIG. 15 is a perspective view of the reel as in FIG. 2.
Figure 16:
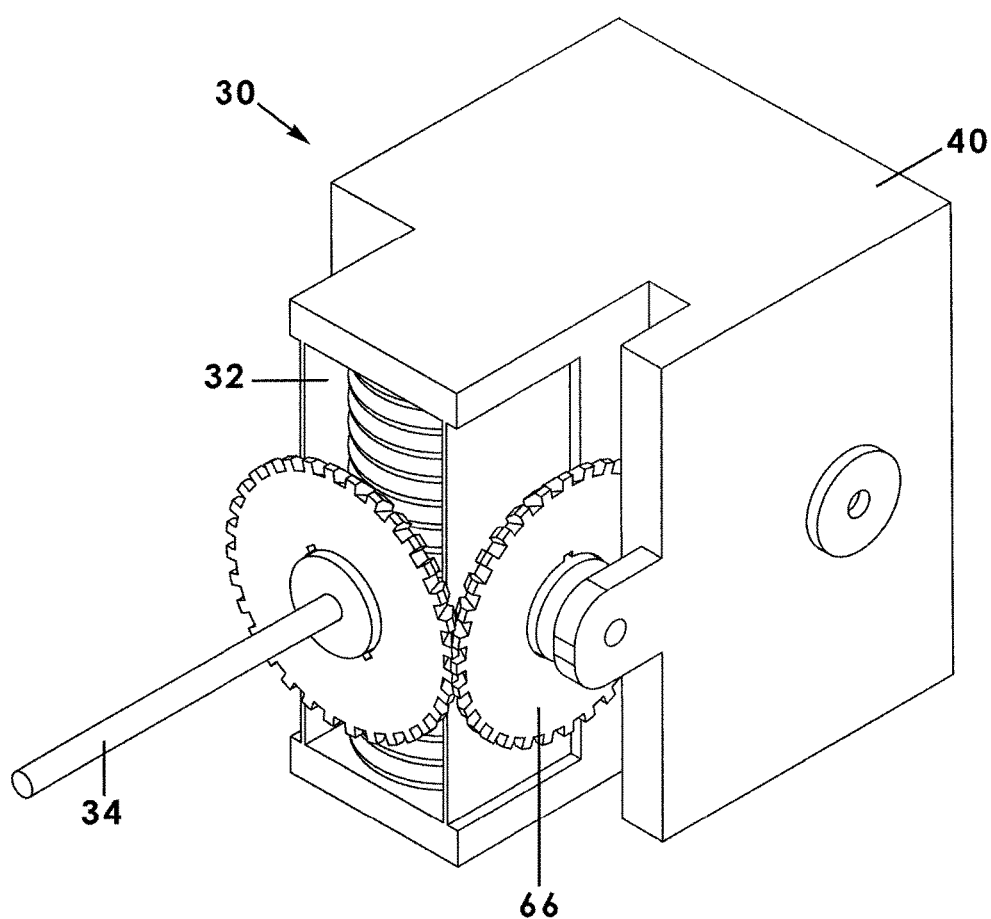
FIG. 16 is a perspective view of the reel and gear train.
Figure 17:
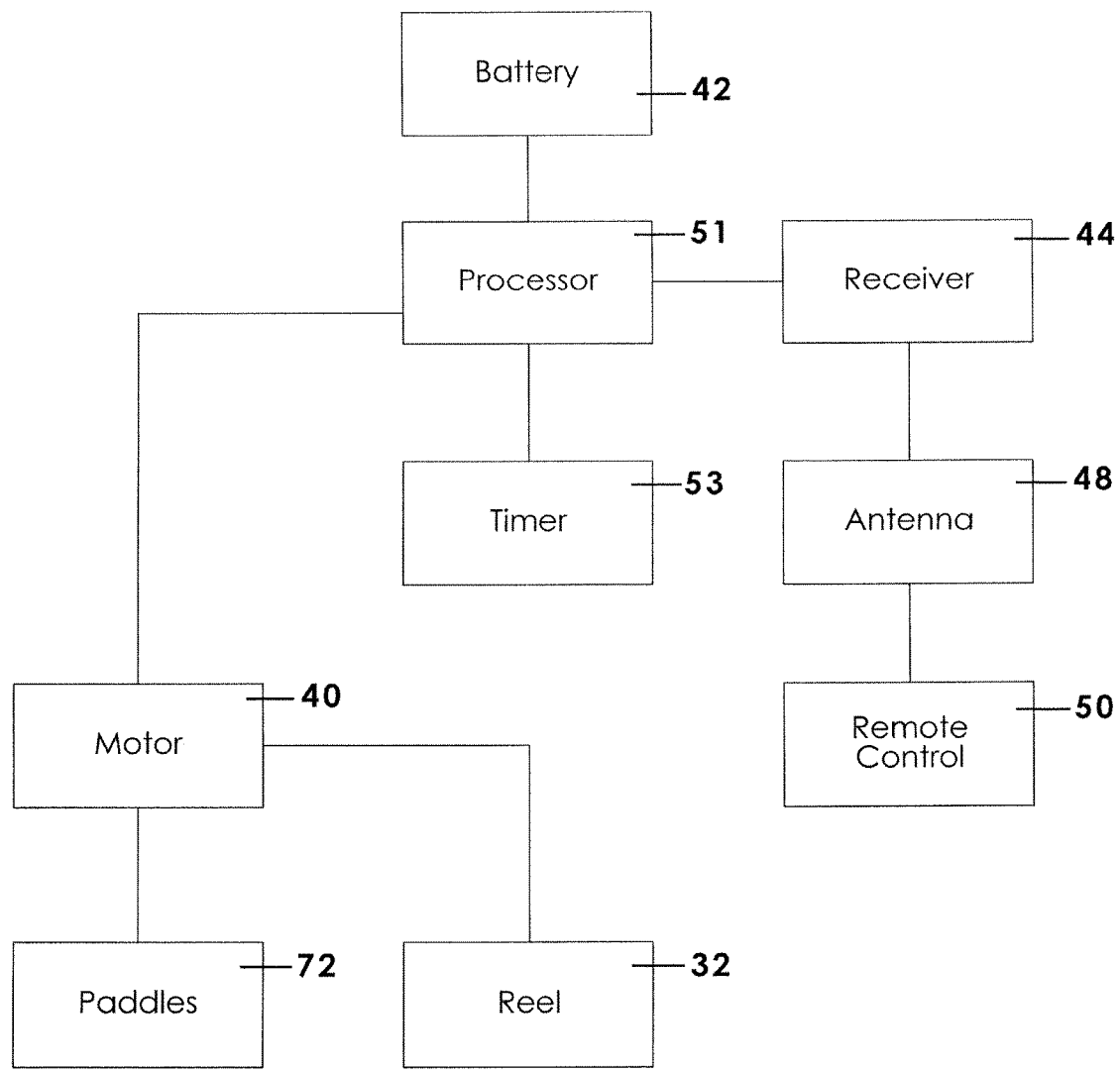
FIG. 17 is a block diagram of the electronic components of the apparatus.

The anchor assembly 30 according to the present invention is situated largely in the interior area of the body 22 and is configured to be operated to anchor the floating apparatus 10 in place when set afloat on a body of water, i.e. such that the floating apparatus 10 does not float away according to the current of the water. More particularly, the anchor assembly 30 includes a reel 32 rotatably mounted inside the body 22 and an anchor line 34 that may be rotatably wound about the reel 32 (FIG. 15). An anchor weight 36, such as a weighted ball, may be coupled to a distal end (i.e. free end) of the anchor line 34 (FIGS. 3a and 3b).

The anchor weight 36 may be coupled to the distal end of the anchor line 34 with a fastener 38. A bottom surface of the keel 24 may define a recess 26 configured to receive the anchor weight fastener 38 in a nested relationship when the anchor line 34 is completely reeled in and wound about the reel 32.

In an embodiment, the floating apparatus 10 includes a motor assembly having a motor 40 electrically connected to a battery 42 and also operatively coupled to the reel 32. When the motor 40 is actuated, i.e. is energized to operate, the reel 32 is caused to rotate—either to pay out the anchor line 34 or to reel in the anchor line 34. The motor 40 may be energized when an actuation signal is received by the receiver 44 as will be described below. In simpler embodiments (not shown), the reel 32 may be operated manually rather than by a motor 40, such as with a crank handle or the like.

In an embodiment, a signal receiving device (referred to herein as a receiver 44) may be electrically connected to the battery 42 and in data communication with the motor 40. The receiver 44 may be positioned in the interior area of the body 22 of the decoy 20. The receiver 44 is configured to receive a respective actuation signal from the ambient air. An antenna 48 may be mounted to extend upwardly from the body 22 of the decoy or mounted inside the neck thereof so as to enhance the reception of the receiver 44. The receiver 44 or associated circuitry is configured to actuate or energize the motor 40 upon receipt of a respective actuation signal to rotate the reel 32 to pay out or reel in the anchor line 34 as described above. It is understood that the actuation signal may be specifically indicative of either paying out or reeling in the anchor assembly 30 and is interpreted and processed by the receiver 44 and circuitry accordingly.

In a related aspect, the anchored floating apparatus 10 includes a remote control device 50 separate and displaced from the body 22 of the decoy 20 and provides a means for communicating with and actuating the reel 32. The remote control device 50 includes a transmitter 52 and associated circuitry or processor 51 that is configured for selectively transmitting the actuation signal into the ambient air—i.e. for transmitting the actuation signal that is then received by a respective receiver 44 as described above.

The remote control device 50 may include an input 54 in data communication with the circuitry or processor associated with the transmitter 52. By way of example but not limitation, the input 54 may be buttons, a touch screen display, a keyboard, a keypad, or the like. Specifically, the input 54 may include buttons indicative of desired movements of the decoy 20, sounds to be played by a speaker 28 (to be described later), or the like. The circuitry or processor 51 associated with the transmitter 52 is configured or programmed to generate an activation signal that is indicative of the input data. In an embodiment, the processor 51 may be electrically connected to a timer 53 and be programmed or otherwise configured to transmit movement or sound actuation signals at predetermined or random time intervals so as to enhance the realism of the decoy 20.

Figure 4A:
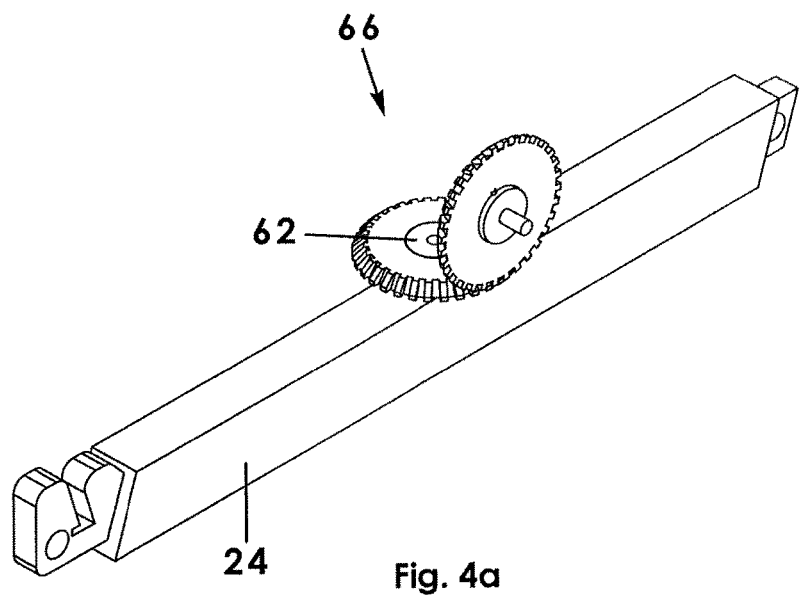
FIGS. 4a and 4b are perspective view from different angles of a gear train incorporated into the anchor assembly of FIGS. 3a and 3b.
Figure 4B:
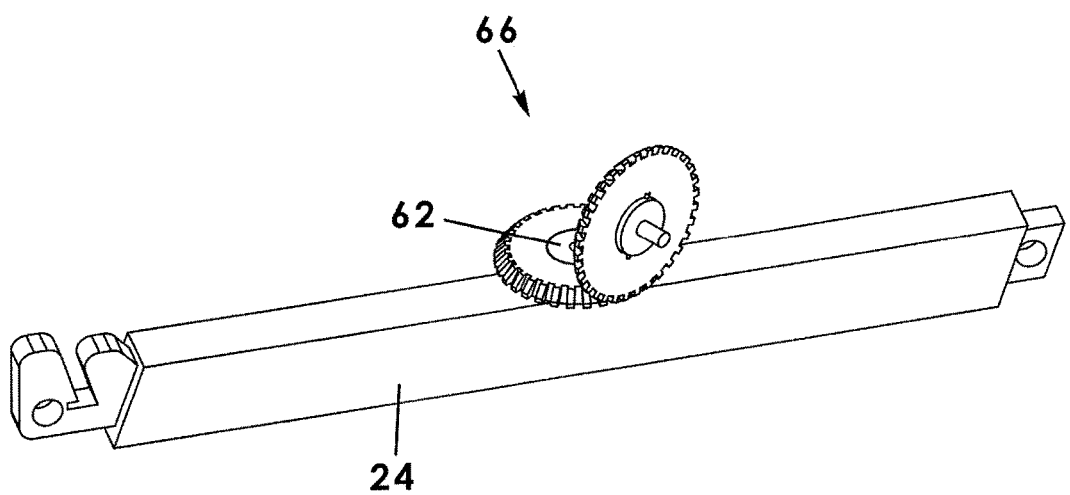
Figure 5:
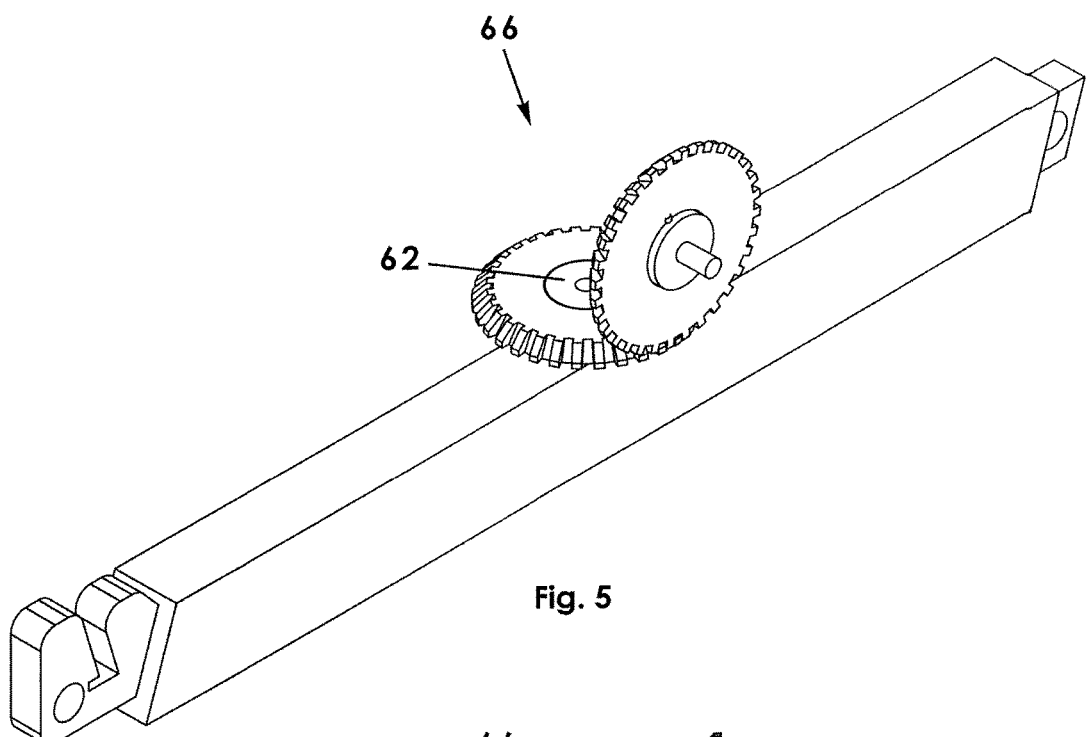
FIG. 5 is an isolated view on an enlarged scale of the bevel gear combination shown in FIG. 4b.
Figure 6A:
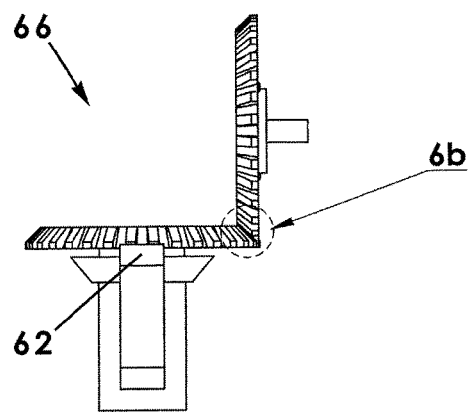
FIG. 6a is an end view of the of the bevel gear combination shown in FIG. 5.
Figure 6B:
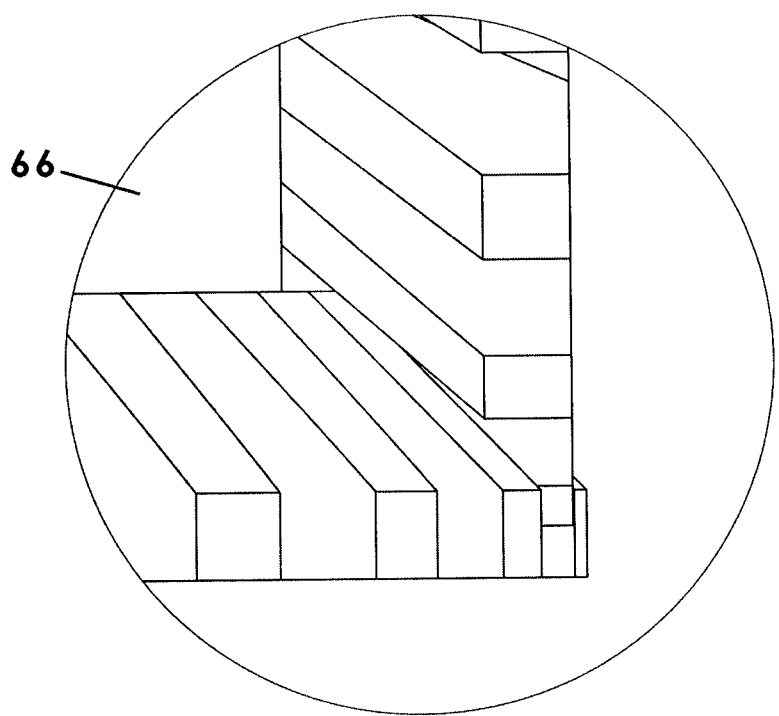
Figure 7A:
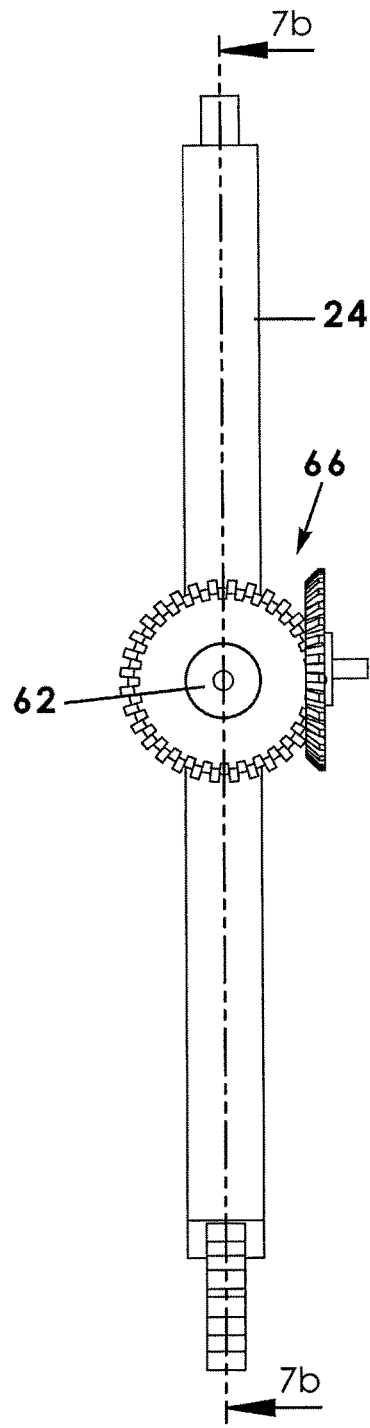
Figure 7B:
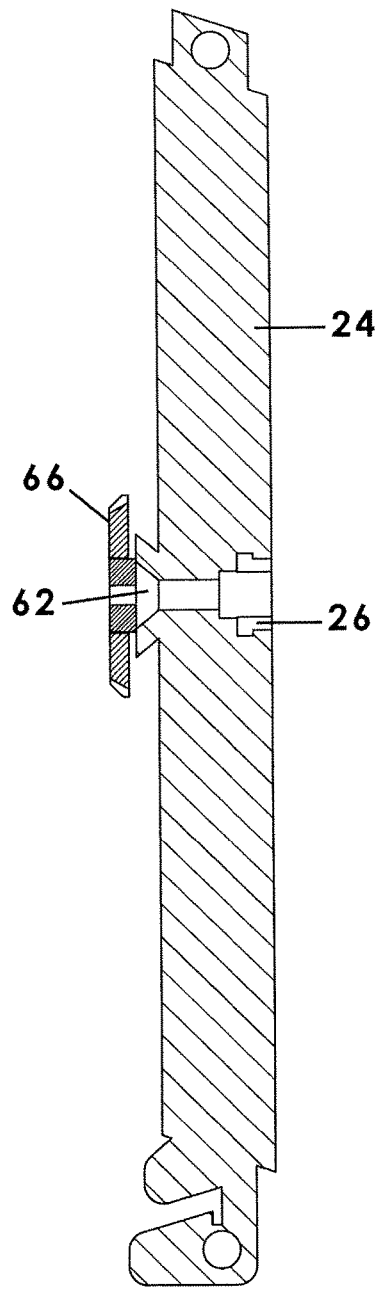
Figure 8A:
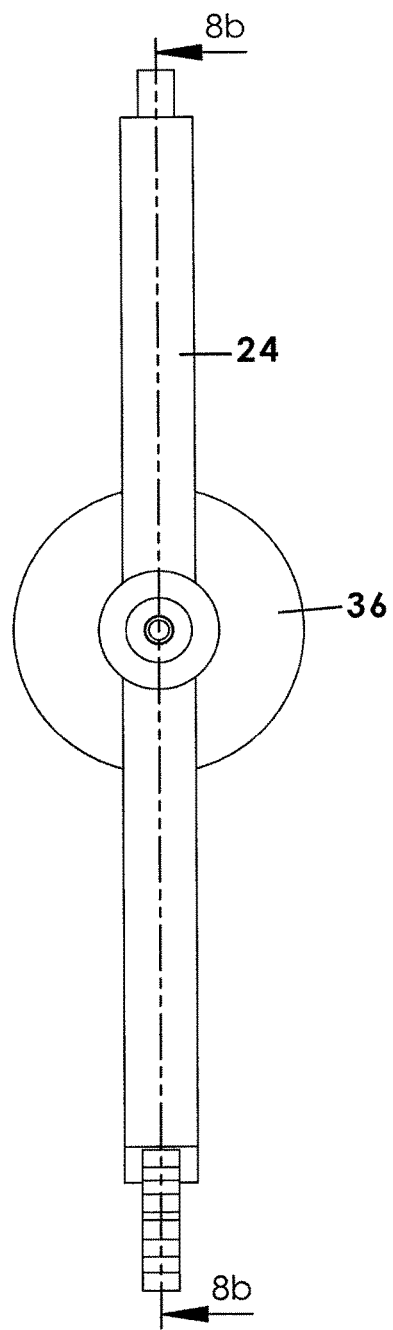
FIG. 8a is a top view of the keel with the anchor assembly in the retracted configuration.
Figure 8B:
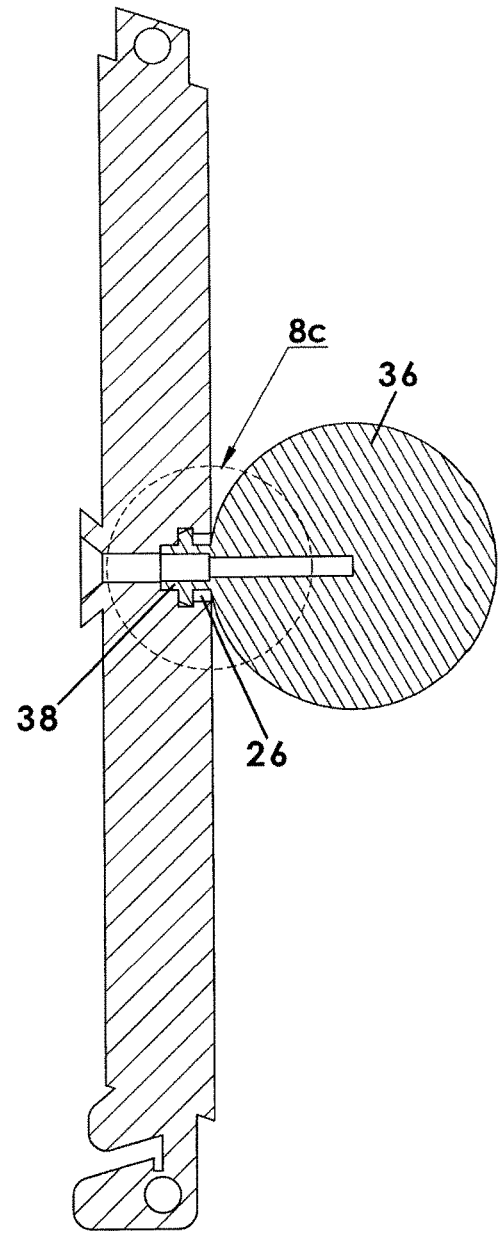
Figure 8C:
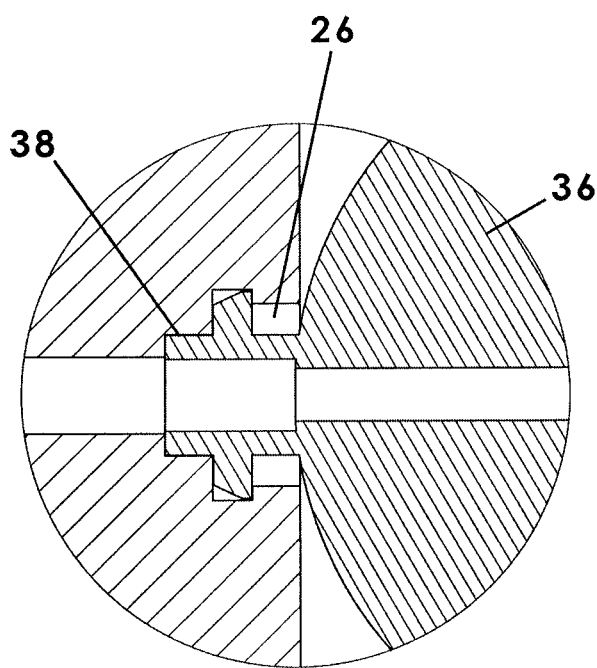
FIG. 8c is an isolated view on an enlarged scale taken from FIG. 8b.
Figure 9:
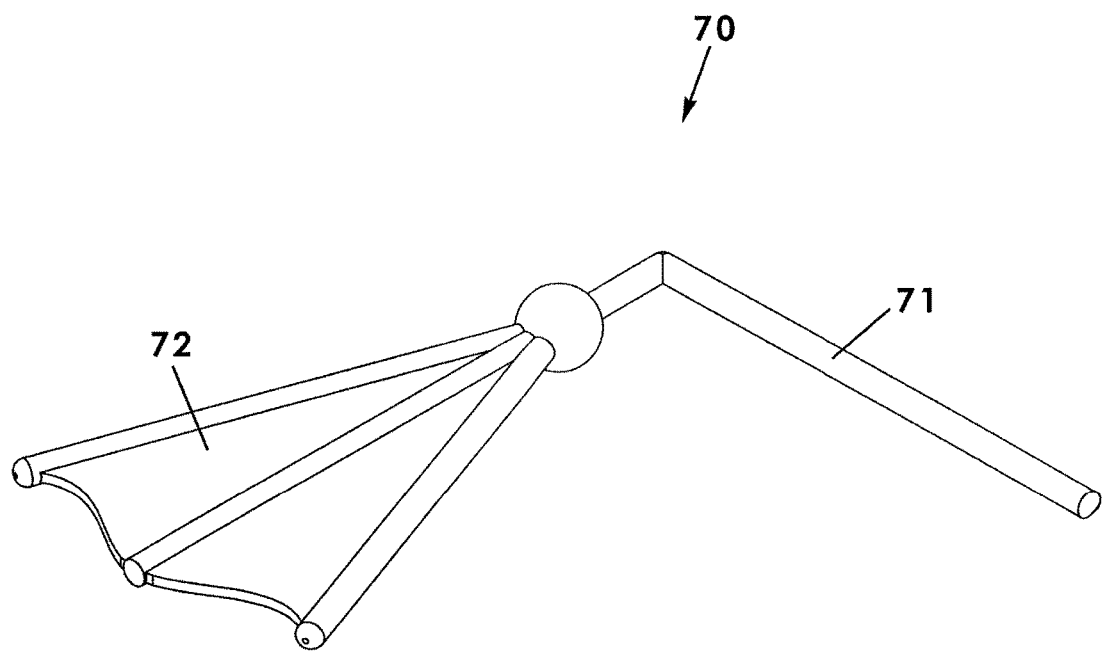
FIG. 9 is a perspective view of a paddle assembly removed from the apparatus shown in FIG. 2.
Figure 10:
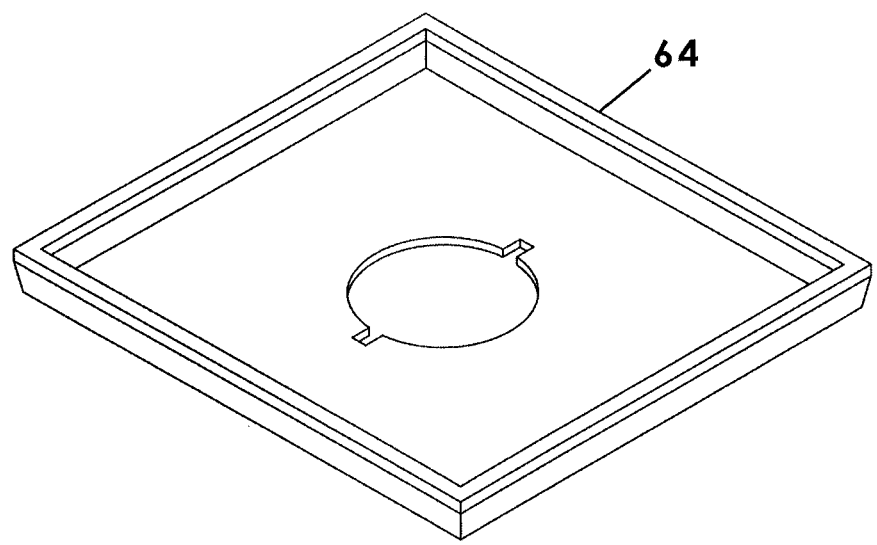
FIG. 10 is a perspective view of a gear casing removed from the apparatus shown in FIG. 2.
Figure 11:
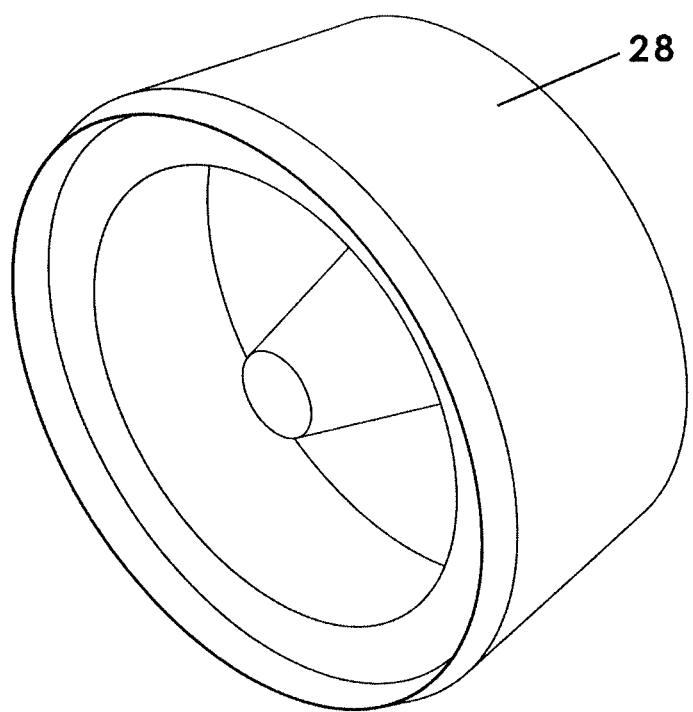
FIG. 11 is a perspective view of a speaker removed from the apparatus shown in FIG. 2.
Figure 12:
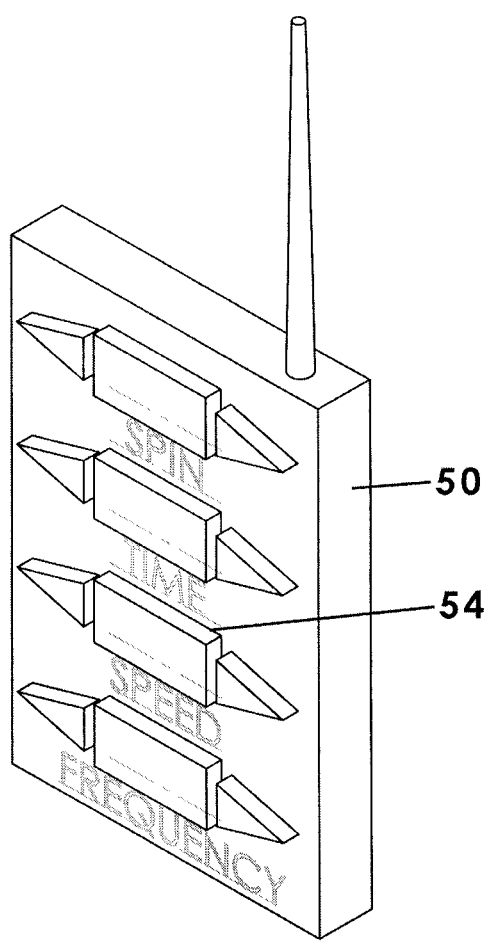
FIG. 12 is a perspective view of a remote control device according to the present invention.
Figures 13A, 13B:
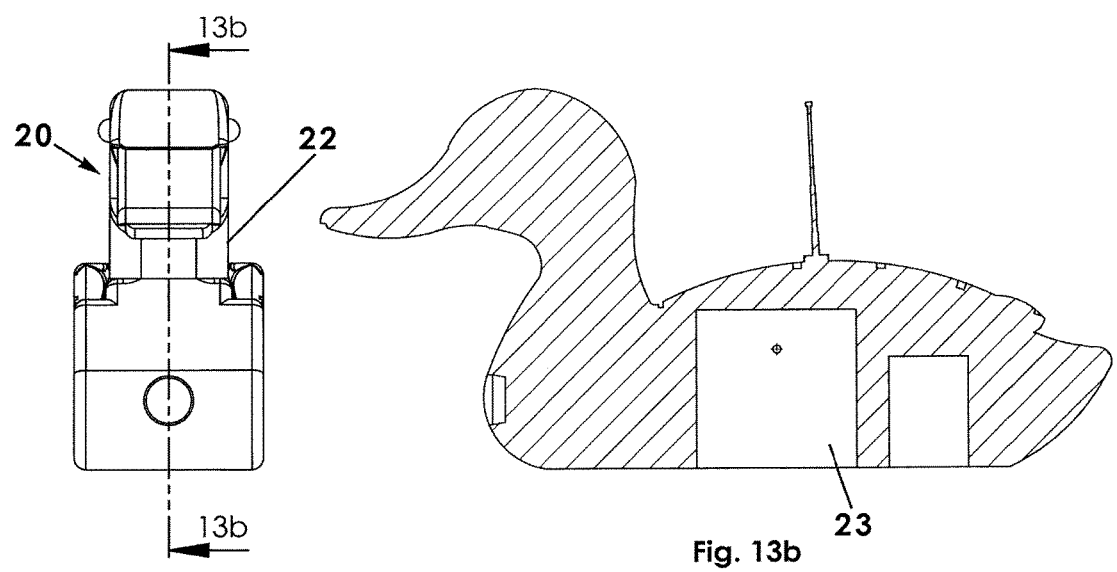
Figure 14A:
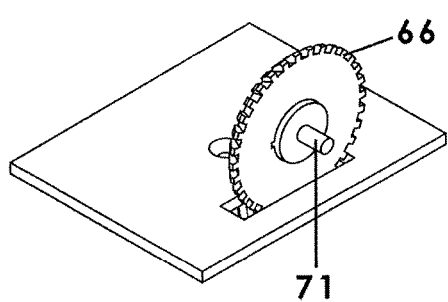
FIG. 14a is an isolated view of the gear train as in FIG. 2.
Figure 14B:
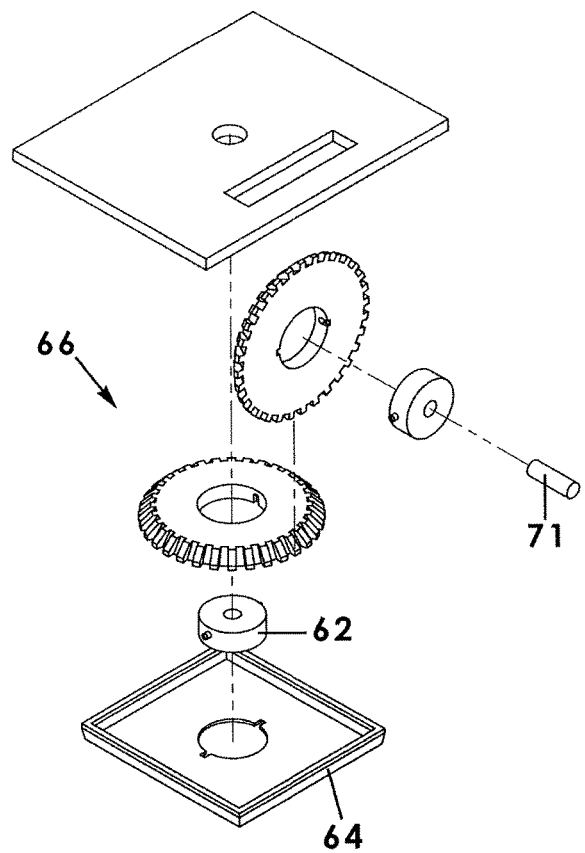

In another aspect, the anchor floating apparatus 10 includes a mounting assembly 60 for rotatably mounting the bottom of the body 22 of the decoy 20 to a top of the keel 24. The mounting assembly 60 is also operatively coupled to the motor 40 of the anchor assembly such that the body 22 is rotated relative to the keel 24 when the motor 40 is energized. A hub 62 is positioned on an upper surface of the keel 24. The mounting assembly 60 may include a lower gear box casing 64 rotatably coupled to the hub 62. Further, the mounting assembly 60 may include a gear train 66 that interfaces the lower gear box casing 64 with the motor 40 such that the mounting assembly 60 is rotated when the motor 40 is energized. The gear train 66 may include a bevel gear combination operatively connecting the lower gear box casing 64 to the motor 40 (FIG. 4a).

In another aspect, the anchor floating apparatus 10 may include a speaker 28 positioned in interior area of the body 22 of the decoy 20 or mounted externally thereto. The speaker 28 may be configured to emit predetermined sounds, such as the quacking sound of a duck, general outdoor sounds, or sounds that contribute to the clandestine intent of the present invention. The speaker 28 may be electrically connected to the battery 42 and may included associate circuitry. In an embodiment, the speaker 28 and related circuitry may be in electrical or data communication with the receiver 44 and configured or programmed to determine what sounds to emit based on a respective actuation signal received by the receiver 44. For instance, a user may enter input into the remote control device 50 that is indicative of what sound the speaker 28 should emit and when it should be emitted.

Figure 2:
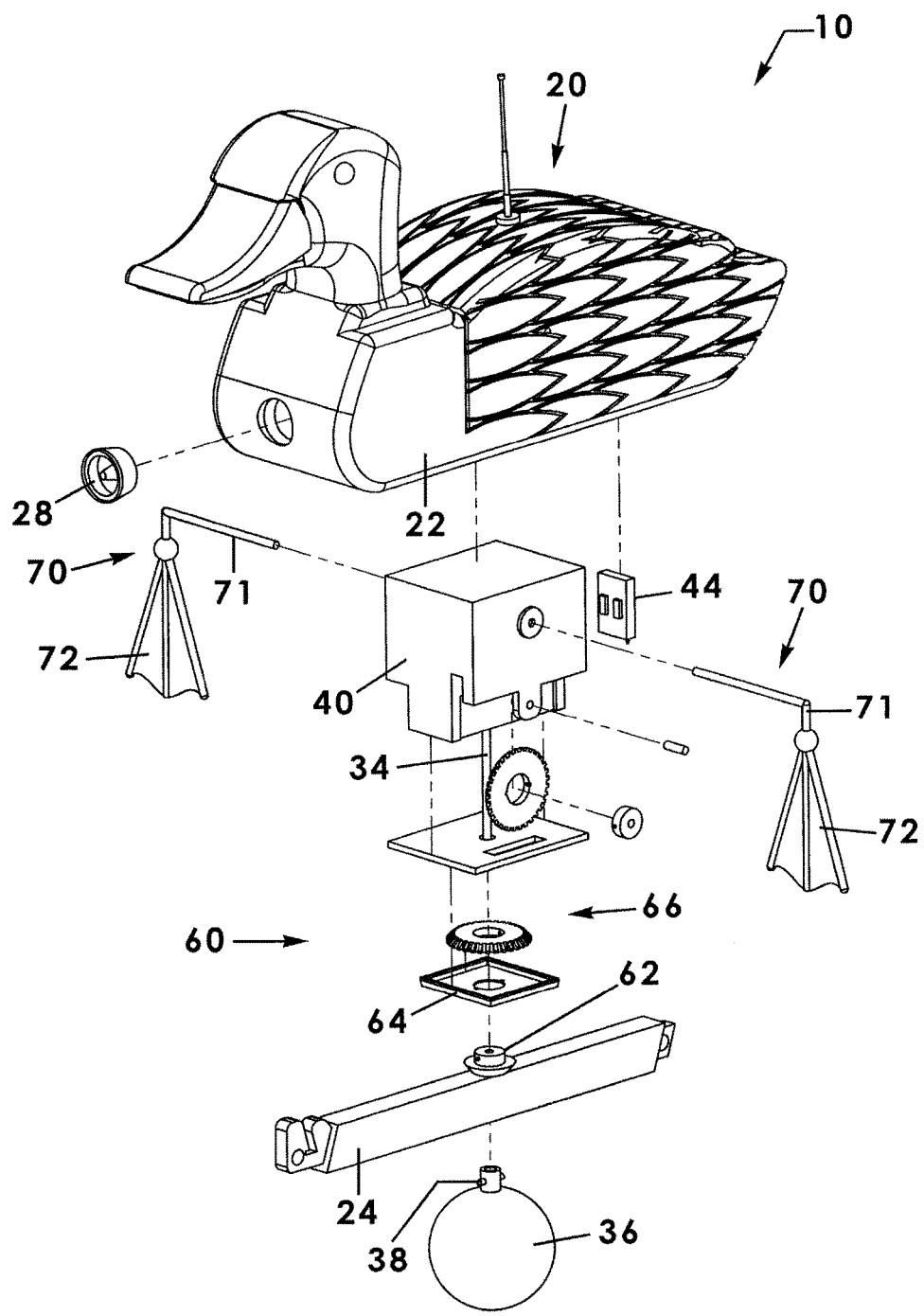
FIG. 2 is an exploded view of the anchored floating apparatus as in FIG. 1.

The anchor floating apparatus 10 may also include a paddle assembly 70 operatively coupled to the motor 40 (FIG. 2). More particularly, the paddle assembly 70 may include a pair of paddles 72 mounted to opposed ends of a shaft 71, respectively, that extends away from opposed sides of the body 22 of the decoy 20 (FIG. 1). Further, each paddle 72 may be positioned in a downward orientation that extends below the keel 24. In use, the paddles 72 are intended to extend into the water on which the decoy 20 is floating. The paddles 72 are configured to oscillate in the water when the motor 40 is energized. In the manner described above, a respective actuation signal may indicate actuation of the paddle assembly 70 to operate in a manner that causes the body 22 to rotate.

In use, the decoy 20 may be placed on the surface of a body of water near an area where a hunter has a desire to attract ducks or similar water fowl, such as with a desire to hunt for ducks. Using the remote control device 50, the user is able to actuate the reel 32 to unwind the anchor weight into the water, is able to actuate sounds through the speaker 28, and to actuate oscillation of the paddles 72 of the paddle assembly 70 to rotate the body 22 as described above.

It is understood that while certain forms of this invention have been illustrated and described, it is not limited thereto except insofar as such limitations are included in the following claims and allowable functional equivalents thereof.

The invention claimed is:

1. A clandestine anchored floating apparatus, comprising:
    a shaped waterfowl decoy having a hollow body defining an interior area and a keel coupled to a bottom of said body;
    an anchor assembly positioned in said interior area of said body that includes a rotatably mounted reel and an elongate anchor line rotatably wound on said reel, said reel configured to selectively pay out or reel in said anchor line relative to said reel;
    wherein said anchor assembly includes an anchor weight coupled to a distal end of said anchor line;
    wherein said anchor assembly includes a motor electrically connected to a battery and operatively coupled to said reel, said motor configured to actuate said reel to pay out or reel in said anchor line relative to said reel when energized; and
        a mounting assembly for rotatably mounting the bottom of said body of said decoy to said keel, said mounting assembly having a gear train operatively connected to said motor such that said body is rotated about a vertical axis of the main body when said motor is energized, the rotation being relative to said keel.

2. The anchored floating apparatus as in claim 1, further comprising:
    a receiver electrically connected to said battery and to said motor, said receiver configured to receive an actuation signal through the ambient air and to energize said motor when said actuation signal is received.

3. The anchored floating apparatus as in claim 2, further comprising a remote control device remote from said body of said decoy, said remote control device having a transmitter and circuitry configured for selectively transmitting said actuation signal into the ambient air.

4. The anchored floating apparatus as in claim 3, wherein:
    said remote control device includes an input in data communication with said circuitry and configured to receive input data;
    said circuitry of said remote control device is configured to generate said activation signal according to said received input data.

5. The anchored floating apparatus as in claim 4, further comprising a speaker electrically connected to said battery and in data communication with said receiver, said speaker configured to emit sound according to said activation signal.

6. The anchored floating apparatus as in claim 1, wherein:
    said keel includes a hub fixedly attached to an upper surface thereof;
    said mounting assembly includes a lower gear box casing rotatably coupled to said hub;
    said gear train includes a bevel gear operatively interfacing said lower gear box casing with said motor such that said mounting assembly is rotated when said motor is energized.

7. The anchored floating apparatus as in claim 1, further comprising a speaker in electrical communication with said battery and configured to emit predetermined sound.

8. The anchored floating apparatus as in claim 1, further comprising:
    a paddle assembly operatively coupled to said motor, said paddle assembly having a pair of paddles extending away from opposite sides of said body of said decoy and positioned to extend below said keel;
    wherein said paddle assembly configured to oscillate said pair of paddles when energized.

9. The anchored floating apparatus as in claim 1, further comprising:
    a paddle assembly operatively coupled to said motor, said paddle assembly having a pair of paddles extending away from opposite sides of said body of said decoy, respectively, and positioned to extend below said keel;
    wherein said paddle assembly configured to oscillate said pair of paddles when energized such that said mounting assembly is rotated relative to said keel.

10. A clandestine anchored floating apparatus, comprising:
    a shaped waterfowl decoy having a hollow body defining an interior area and a keel movably coupled to a bottom of said body; and
    an anchor assembly positioned in said interior area of said body that includes a rotatably mounted reel and an elongate anchor line rotatably wound on said reel, said reel configured to selectively pay out or reel in said anchor line upon rotational movement of said reel;
    wherein said anchor assembly includes an anchor weight coupled to a distal end of said anchor line, a bottom surface of said keel defining a recess configured to receive said anchor weight in a nested configuration when said anchor line is completely reeled in;
    wherein said anchor assembly includes a motor electrically connected to a battery and operatively coupled to said reel, said motor configured to actuate said reel to pay out or reel in said anchor line relative to said reel when energized; and
        a mounting assembly for rotatably mounting the bottom of said body of said decoy to said keel, said mounting assembly having a gear train operatively connected to said motor such that said body is rotated about a vertical axis of the main body when said motor is energized, the rotation being relative to said keel.

11. The anchored floating apparatus as in claim 10, further comprising:
    a receiver electrically connected to said battery and to said motor, said receiver configured to receive an actuation signal through the ambient air and to energize said motor when said actuation signal is received; and
    an antenna electrically connected to said receiver and configured to enhance reception of said activation signal.

12. The anchored floating apparatus as in claim 11, further comprising a remote control device remote from said body of said decoy that includes a transmitter and circuitry configured for selectively transmitting said actuation signal into the ambient air.

13. The anchored floating apparatus as in claim 12, wherein:

said remote control device includes an input in data communication with said circuitry and configured to receive input data from a user indicative of a desired operation of said decoy; and said circuitry of said remote control device is configured to generate said activation signal according to said received input data.

14. The anchored floating apparatus as in claim 13, further comprising a speaker electrically connected to said battery and in data communication with said receiver, said speaker configured to emit sound according to said activation signal.

15. The anchored floating apparatus as in claim 10, wherein:

said keel includes a hub fixedly attached to an upper surface thereof;

said mounting assembly includes a lower gear box casing rotatably coupled to said hub;

said mounting assembly includes a gear train for interfacing said lower gear box casing with said motor such that said mounting assembly is rotated when said motor is energized.

16. The anchored floating apparatus as in claim 10, further comprising a speaker in electrical communication with said battery and configured to emit predetermined sounds.

17. The anchored floating apparatus as in claim 10, further comprising:

a paddle assembly operatively coupled to said motor, said paddle assembly having a pair of paddles mounted to opposed ends of a shaft extending away from opposite sides of said body of said decoy and positioned to extend below said keel; and wherein said paddle assembly is configured to oscillate said pair of paddles when energized.

18. The anchored floating apparatus as in claim 10, further comprising:

a paddle assembly operatively coupled to said motor, said paddle assembly having a pair of paddles extending away from opposite sides of said body of said decoy, respectively, and positioned to extend below said keel;

wherein said paddle is assembly configured to oscillate said pair of paddles when energized such that said mounting assembly is selectively rotated relative to said keel.

\* \* \* \* \*